(12) United States Patent
Rangasamy et al.

(10) Patent No.: US 11,481,228 B2
(45) Date of Patent: Oct. 25, 2022

(54) SELF-SERVICE ORCHESTRATION PLATFORM

(71) Applicant: Oracle International Corporation, Redwood Shores, CA (US)

(72) Inventors: Venkatachalam Rangasamy, Fremont, CA (US); Jaganathan Jeyapaul, Saratoga, CA (US); Krithika Bharathi Sundaram, Bangalore (IN); Parvathy Unnikrishnan, Bangalore (IN); Kumar Pratik, Bangalore (IN); Narayanan Selvam, Bangalore (IN); Jayadev Hiremath, Tracy, CA (US)

(73) Assignee: Oracle International Corporation, Redwood Shores, CA (US)

( * ) Notice: Subject to any disclaimer, the term of this patent is extended or adjusted under 35 U.S.C. 154(b) by 28 days.

(21) Appl. No.: 16/815,601

(22) Filed: Mar. 11, 2020

(65) Prior Publication Data

US 2020/0293337 A1 Sep. 17, 2020

Related U.S. Application Data

(60) Provisional application No. 62/817,686, filed on Mar. 13, 2019.

(51) Int. Cl.
*G06F 9/445* (2018.01)
*G06F 9/54* (2006.01)
(Continued)

(52) U.S. Cl.
CPC .......... *G06F 9/44505* (2013.01); *G06F 9/451* (2018.02); *G06F 9/54* (2013.01);
(Continued)

(58) Field of Classification Search
CPC ........ G06F 9/44505; G06F 9/54; G06F 9/451; G06F 8/60; H04L 67/2833; H04L 41/0893; H04L 63/20; H04L 67/1097
(Continued)

(56) References Cited

U.S. PATENT DOCUMENTS 6,687,735 B1 * 2/2004 Logston .................... G06F 8/60
370/486
8,611,947 B2 * 12/2013 Mednieks ............... H04L 69/18
455/552.1

(Continued)

*Primary Examiner* — David R Lazaro
*Assistant Examiner* — Mariegeorges A Henry
(74) *Attorney, Agent, or Firm* — Invoke

(57) ABSTRACT

Techniques for self-service orchestration are disclosed. A system deploys instances of a self-service orchestration agent to tenant-specific software-as-a-service (SaaS) environments operating in a multi-tenant SaaS environment, without reconfiguring existing software in the tenant-specific SaaS environments. Each self-service orchestration agent includes functionality to configure one or more components. Each tenant-specific SaaS environment includes a dedicated set of software operating on a dedicated logical partition of hardware infrastructure. The system receives, via a self-service orchestration interface, a request to configure a component across the tenant-specific SaaS environments. The system: transmits the request to a self-service orchestration module that is operating in the multi-tenant SaaS environment and configured to communicate with each instance of the self-service orchestration agent; dispatches, by the self-service orchestration module, the request to each instance of the self-service orchestration agent; configures, by each of the self-service orchestration agents in a corresponding tenant-specific SaaS environment, the component.

20 Claims, 8 Drawing Sheets

(51) Int. Cl.
    *H04L 41/0893*     (2022.01)
    *H04L 9/40*     (2022.01)
    *G06F 9/451*     (2018.01)
    *H04L 67/566*     (2022.01)

(52) U.S. Cl.
    CPC .......... *H04L 41/0893* (2013.01); *H04L 63/20* (2013.01); *H04L 67/566* (2022.05)

(58) Field of Classification Search
    USPC .................................................. 709/220, 224
    See application file for complete search history.

(56) References Cited

U.S. PATENT DOCUMENTS

| | | | | |
|---|---|---|---|---|
| 9,104,672 | B2* | 8/2015 | Beaty | G06F 11/3409 |
| 9,207,934 | B2* | 12/2015 | Larimore | G06F 9/455 |
| 9,575,979 | B1* | 2/2017 | McClintock | G06F 16/152 |
| 9,860,230 | B1* | 1/2018 | Sobel | G06F 21/33 |
| 10,496,611 | B1* | 12/2019 | Singh | G06F 16/185 |
| 2012/0272290 | A1* | 10/2012 | Zaitsev | G06F 21/552 |
| | | | | 726/1 |

\* cited by examiner

SELF-SERVICE ORCHESTRATION PLATFORM

INCORPORATION BY REFERENCE

This application is hereby incorporated by reference: application No. 62/817,686 filed on Mar. 13, 2019. The Applicant hereby rescinds any disclaimer of claim scope in the parent application or the prosecution history thereof and advises the USPTO that the claims in this application may be broader than any claim in the parent application.

TECHNICAL FIELD

The present disclosure relates to orchestration. In particular, the present disclosure relates to self-service orchestration.

BACKGROUND

Orchestration uses programmatic tools to configure software components. An orchestration service receives a request to configure a software component and executes software to service the request with minimal, if any, additional user input. Orchestration improves the efficiency of configuring components and reduces the frequency of errors and inaccuracies that occur when users try to configure software components manually.

A multi-tenant software-as-a-service (SaaS) environment is a computing environment that supplies software services, via a network, to multiple tenants. A tenant may be a corporation, organization, enterprise, or other entity that accesses a shared computing resource, such as a software application. Tenants may be independent from each other. For example, a business or operation of one tenant may be separate from a business or operation of another tenant.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. ARCHITECTURAL OVERVIEW
2.1 SELF-SERVICE ORCHESTRATION SYSTEM
2.2 MULTI-TENANT SAAS ENVIRONMENT
2.3 TENANT-SPECIFIC SAAS ENVIRONMENT
3. SELF-SERVICE ORCHESTRATION
3.1 OBTAINING A SELF-SERVICE ORCHESTRATION CATALOG
3.2 DISPATCHING A SELF-SERVICE ORCHESTRATION REQUEST
3.3 CONFIGURING A COMPONENT BASED ON A SELF-SERVICE ORCHESTRATION REQUEST
4. MISCELLANEOUS; EXTENSIONS
5. HARDWARE OVERVIEW
6. COMPUTER NETWORKS AND CLOUD NETWORKS
7. MICROSERVICE APPLICATIONS

1. General Overview

One or more embodiments introduce self-service orchestration features to tenant-specific SaaS environments, each operating on a corresponding dedicated logical partition of hardware infrastructure in a multi-tenant SaaS environment. The self-service orchestration techniques described below may configure a component by installing the component, patching the component, upgrading the component, removing the component, modifying a setting of the component, and/or otherwise introducing, removing, or reconfiguring functionality of the component in the tenant-specific SaaS environments. In one or more embodiments, a discoverable self-service catalog supplies information to users about the self-service orchestration features that are introduced to the tenant-specific SaaS environment using techniques described herein.

To avoid interfering with the operation of existing software in the tenant-specific SaaS environments, one or more embodiments perform self-service orchestration using instances of self-service orchestration agents that are deployed to each tenant-specific SaaS environment without reconfiguring the existing software. In addition, one or more embodiments include a drop-in architecture that supports the deployment of any kind of self-service orchestration module to a multi-tenant SaaS environment. The drop-in self-service orchestration module may support self-service orchestration for any configurable component, so long as the self-service orchestration module adheres to one or more architectural constraints imposed by the drop-in architecture.

One or more embodiments described in this Specification and/or recited in the claims may not be included in this General Overview section.

2. Architectural Overview
2.1 Self-Service Orchestration System

Figure 1:
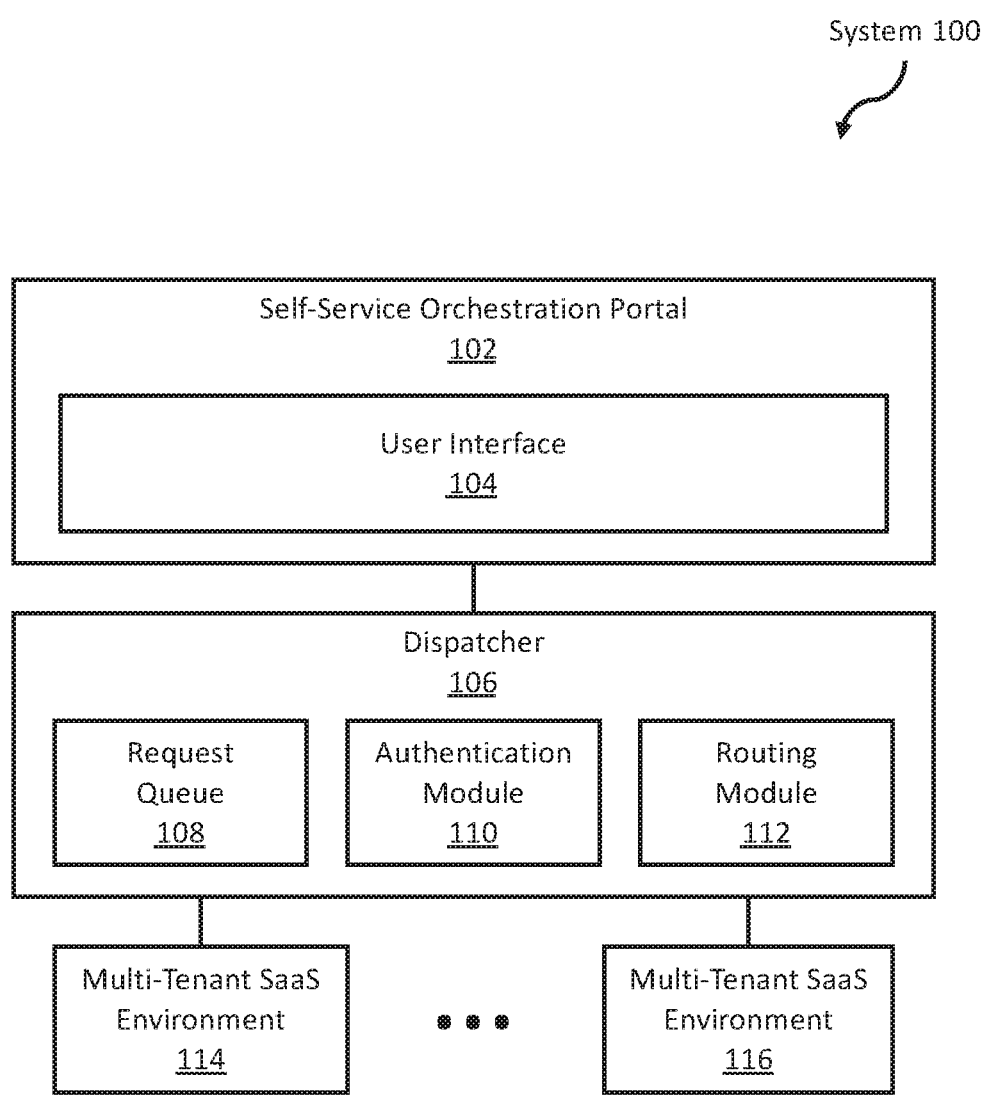
FIG. 1 illustrates a system in accordance with one or more embodiments.

FIG. 1 illustrates a system 100 in accordance with one or more embodiments. As illustrated in FIG. 1, system 100 includes a self-service orchestration portal 102, dispatcher 106, multi-tenant SaaS environments 114, 116, and various components thereof. In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component. Additional embodiments and/or examples relating to computer networks are described below.

In an embodiment, the system 100 includes a self-service orchestration portal 102. The self-service orchestration portal 102 is configured to receive user input, process the user input using one or more other components of the system 100, and present data responsive to the user input. Specifically, the self-service orchestration portal 102 includes a user interface 104 configured to receive user input and present data responsive to the user input. The user input may include a self-service orchestration request. Specifically, the user input may include a request to obtain a self-service orchestration catalog, configure a component using self-service orchestration, and/or obtain the status of a prior self-service orchestration request. In an embodiment, the self-service orchestration portal 102 is configured to transmit self-service orchestration requests to a dispatcher 106, described below.

In general, the user interface 104 refers to hardware and/or software configured to facilitate communications between a user and the self-service portal 102. The user interface 104 renders user interface elements and receives input via user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms. As described below, some examples of the interface may be configured based on functions and/or parameter types associated with a self-service orchestration module.

In an embodiment, different components of the user interface 104 are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). The user interface 104 may be specified in one or more other languages, such as Java, C, or C++.

In an embodiment, a dispatcher 106 refers to hardware and/or software configured to receive a self-service orchestration request from a self-service portal 102. The dispatcher 106 may be configured to route the request to one or more destinations based on the content and/or type of the request. Specifically, the dispatcher 106 may be configured to route each request to one or more multi-tenant SaaS environments 114, 116.

In an embodiment, a multi-tenant SaaS environment 114, 116 is a computing environment that supplies software services, via a network, to multiple tenants. A multi-tenant SaaS environment 114, 116 may operate in a data center. Multiple different multi-tenant SaaS environments 114, 116 may operate, respectively, in different data centers. In an embodiment, each multi-tenant SaaS environment 114, 116 includes multiple tenant-specific SaaS environments. Examples of multi-tenant and tenant-specific SaaS environments are described below.

In an embodiment, the dispatcher 106 includes a request queue 108. The dispatcher 106 is configured to place incoming requests in the request queue 108 and handle the requests according to a request handling policy. The request handling policy may be a first-in, first-out (FIFO) policy. Alternatively or additionally, the request handling policy may be priority-based, with higher-priority requests being handled before lower-priority requests. Alternatively or additionally, the request handling policy may throttle requests to avoid overutilizing system resources.

In an embodiment, the dispatcher 106 includes an authentication module 110. The authentication module 110 is configured to determine whether each request is an authorized request, i.e., is associated with valid authorization credentials. Authorizing each request may help ensure that malicious or otherwise unauthorized entities (e.g., other than the self-service portal 102) do not gain access to the dispatcher 106. In an embodiment, the authentication module 110 authenticates each request using JavaScript Object Notation (JSON) Web Token (JWT) technology and/or another kind of authentication technology.

In an embodiment, the dispatcher 106 includes a routing module 112. The routing module 112 is configured to identify one or more destination multi-tenant SaaS environments 114, 116 for each request and route the request to the identified multi-tenant SaaS environment(s). Specifically, the routing module 112 may determine that the request is directed to a particular tenant-specific SaaS environment and determine which multi-tenant SaaS environment includes that particular tenant-specific SaaS environment. In addition, the routing module 112 may be configured to select a particular application programming interface (API) to use when transmitting a request to a multi-tenant SaaS environment. Specifically, the routing module 112 may be configured to determine that a destination tenant-specific SaaS environment is either an Active Directory (AD) environment or a non-AD environment. Based on the type of environment, the routing module 112 may route the request to either an AD API or a non-AD API in the destination multi-tenant SaaS environment.

In an embodiment, components of the system 100 (including, but not limited to, a multi-tenant SaaS environment and a tenant-specific SaaS environment, described below) are implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/ or transmitter, a base station, a communication management device, a router, a switch, a controller, an access point, and/or a client device.

2.2 Multi-Tenant SaaS Environment

Figure 2:
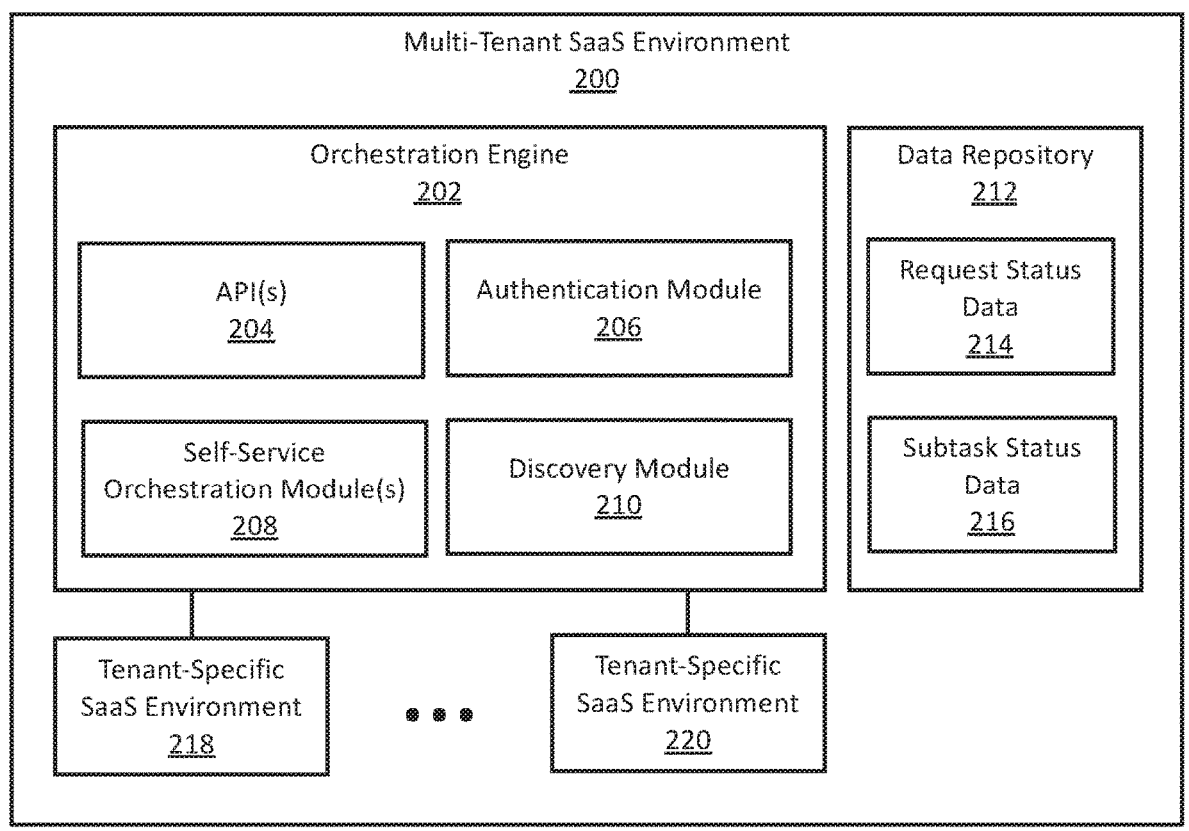
FIG. 2 illustrates a multi-tenant SaaS environment in accordance with one or more embodiments.

FIG. 2 illustrates a multi-tenant SaaS environment 200 in accordance with one or more embodiments. As illustrated in FIG. 2, multi-tenant SaaS environment 200 includes an orchestration engine 202, data repository 212, tenant-specific SaaS environments 218, 220, and various components thereof. In one or more embodiments, the multi-tenant SaaS environment 200 may include more or fewer components than the components illustrated in FIG. 2. The components illustrated in FIG. 2 may be local to or remote from each other. The components illustrated in FIG. 2 may be implemented in software and/or hardware. Each component may be distributed over multiple applications and/or machines. Multiple components may be combined into one application and/or machine. Operations described with respect to one component may instead be performed by another component. Additional embodiments and/or examples relating to computer networks are described below.

In an embodiment, the multi-tenant SaaS environment 200 includes an orchestration engine 202 (also referred to as a "platform"). The orchestration engine 202 refers to hardware and/or software configured to receive a self-service orchestration request (e.g., from a dispatcher 106 as illustrated in FIG. 1) associated with one or more tenant-specific SaaS environments 218, 220 and process the self-service orchestration request. In an embodiment, the orchestration engine 202 operates within the multi-tenant SaaS environment 200 and outside of any particular tenant-specific SaaS environment 218, 220.

In an embodiment, the orchestration engine 202 receives a request via one or more API's (204). As described above, the tenant-specific SaaS environments 218, 220 may include one or more Active Directory (AD) environments and one or more non-AD environments. The orchestration engine 202 may include an API for requests directed to AD environments and another API for requests directed to non-AD environments. Alternatively or additionally, an API 204 may be configured to determine a type of each request and route the request to a corresponding self-service orchestration module 208, described below.

In an embodiment, the orchestration engine 202 includes an authentication module 206. The authentication module 206 is configured to determine whether each request is an authorized request, i.e., is associated with valid authorization credentials. Authorizing each request may help ensure that malicious or otherwise unauthorized entities (e.g., other than the dispatcher 106) do not gain access to the orchestration engine 202. In an embodiment, the authentication module 206 authenticates each request using JWT technology and/or another kind of authentication technology.

In an embodiment, the orchestration engine 202 includes one or more self-service orchestration modules 208. Each self-service orchestration module 208 is a set of executable code configured to manage self-service orchestration tasks for a particular component in the tenant-specific SaaS environments 218, 220. For example, one self-service orchestration module 208 may be configured to manage self-service orchestration tasks for a language pack, and another self-service orchestration module 208 may be configured to manage self-service orchestration tasks for a data backup service or packet inspection. In an embodiment, the orchestration engine 202 is not limited to a predefined set of self-service orchestration modules 208. Instead, the orchestration engine 202 may include a drop-in architecture that supports the deployment of any kind of self-service orchestration module 208, so long as the self-service orchestration module 208 adheres to one or more architectural constraints (e.g., code type, API signatures, etc.) imposed by the drop-in architecture. For example, the self-service orchestration engine 202 may execute in a Java™ runtime environment and support self-service orchestration modules 210 as drop-in executable files, such as Java Archive (JAR) files, source code that is subsequently compiled, and/or executable binary files.

In some examples, a self-service orchestration engine 202 may include an interface that is configured based on the functions to be updated in the tenant-specific SaaS environment. The interface of the self-service orchestration engine 202 may be configured based one or more parameters and/or parameter types corresponding to functions associated with the self-service orchestration module 208. The configured interface of the self-service orchestration engine 202 may then accept and/or modify data and pass it to the function of the tenant-specific SaaS environment associated with the self-service orchestration module 208. For example, if a self-service orchestration module 208 identifies parameters corresponding to updates to a deep packet inspection function in the tenant-specific SaaS environment, these parameters may be used to configure an interface of the self-service orchestration engine 202 to receive packets and pass them to the updated security module of the tenant-specific SaaS environment.

In some examples, the parameters and/or parameter types may be used to configure a self-service orchestration engine 202 to apply policies that modify data before the data is passed to an associated self-service orchestration module 208 function. For example, if an authentication parameter is identified, the self-service orchestration engine 202 may implement authentication policies that validate authentication credentials before passing any subsequent data to the self-service orchestration module 208.

In an embodiment, a self-service orchestration module 208 is configured to deploy instances of a self-service orchestration agent (described below) to each of the tenant-specific SaaS environments 218, 220. As indicated above, in some embodiments, a self-service orchestration module 208 may be executable code in the form of a binary file, script or source code that is compiled, or other similar forms of executable code. The self-service orchestration module 208 may deploy an instance of the agent to a tenant-specific SaaS environment 218, 220 when the self-service orchestration module 208 is deployed to the orchestration engine 202. Alternatively or additionally, the orchestration engine 202 may deploy an instance of the agent to a tenant-specific SaaS environment 218, 220 responsive to a request to configure a component (i.e., a component supported by that particular self-service orchestration module 208). Deploying an instance of the agent responsive to a user request may help preserve resources (e.g., network bandwidth and/or processing cycles) in the event that a self-service orchestration module 208 is never used or is only used for a subset of the tenant-specific SaaS environments 218, 220.

In an embodiment, responsive to a user request to configure a component in one or more of the tenant-specific SaaS systems 218, 220, a self-service orchestration module 208 is configured to instruct one or more instances of self-service orchestration agents, deployed to the target tenant-specific SaaS environment(s), to configure the component accordingly. In an embodiment, the self-service orchestration agent includes a script (e.g., a secure shell (SSH) script) and the self-service orchestration module 208 is configured to execute the script within the target tenant-specific SaaS environment(s). In an embodiment, when the self-service orchestration module 208 instruct multiple instances of self-service orchestration agents to configure a component in multiple tenant-specific SaaS systems 218, 220, the orchestration engine 202 treats each instruction as a subtask of the request.

The executable drop-in file (i.e., the self-service orchestration module 208) may be accompanied by a manifest. The manifest may be separate from the self-service orchestration module 208 in some examples, or be stored within the self-service orchestration module 208 in other examples. In some examples, the manifest identifies functions in the self-service orchestration module 208 and the corresponding features to be updated in a tenant-specific SaaS environment upon execution of the functions. In some examples, a manifest may also identify communication protocols to be used for communications between a self-service orchestration agent and a tenant-specific SaaS environment. In some examples, a manifest may also identify policies and/or policy settings to be executed in connection with, but separate from, the functions of the self-service orchestration module 208. The manifest may also identify parameter types corresponding to functions associated with an self-service orchestration module 208. These parameter types may include identifying the end points of the functions associated with the self-service orchestration module 208, such as parameters and returns values.

In an embodiment, the multi-tenant SaaS environment 200 includes a data repository 212. The data repository 212 may be configured to store request status data 214. Request status data 214 includes overall status information associated with each request, regardless of the number of subtasks (e.g., instructions transmitted to multiple instances of self-service orchestration agents in multiple tenant-specific SaaS environments). Alternatively or additionally, the data repository 212 may be configured to store subtask status data 216. Subtask status data includes status information for each particular subtask of a request. The self-service orchestration engine 202 may be configured to supply request status data 214 and/or subtask status data 216 responsive to a request for a status update. In an embodiment, specific requests are mapped to one or more of a request identifier, a job identifier, and/or another unique identifier or combination thereof. A self-service orchestration portal may generate one or more of the unique identifier(s) responsive to receiving the request. The identifier(s) may be included with the request as the request is routed through the system.

In an embodiment, the data repository 212 includes data describing one or more components in the multi-tenant SaaS environment 200 (i.e., components in one or more tenant-specific SaaS environments 218, 220 within the multi-tenant SaaS environment) that are serviceable using self-service orchestration. The data describing the component(s) may include, but is not limited to, one or more of: component names, versions, upgrade histories, and/or another kind of descriptive data or combination thereof.

A data repository 212 may be any type of storage unit and/or device (e.g., a file system, database, collection of tables, or any other storage mechanism) for storing data. Further, a data repository 212 may include multiple different storage units and/or devices. The multiple different storage units and/or devices may or may not be of the same type or located at the same physical site. Further, a data repository 212 may be implemented or may execute on the same computing system as one or more other components described herein. Alternatively or additionally, a data repository 212 may be implemented or executed on a computing system separate from one or more other components described herein. A data repository 212 may be communicatively coupled to one or more other components of the multi-tenant SaaS environment 200 via a direct connection or via a network. Information describing request status data 214 and/or subtask status data 216 may be implemented across any of components within the multi-tenant SaaS environment 200. However, this information is illustrated within the data repository 212 for purposes of clarity and explanation.

In an embodiment, the orchestration engine 202 includes a discovery module 210. The discovery module 210 may be configured to gather information (e.g., from the data repository 212) about one or more components in the multi-tenant SaaS environment 200 that are serviceable using self-service orchestration. The discovery module 210 may be configured to transmit the information to a self-service orchestration portal (e.g., self-service orchestration portal 102 of FIG. 1), for use in a self-service orchestration catalog.

2.3 Tenant-Specific SaaS Environment

Figure 3:
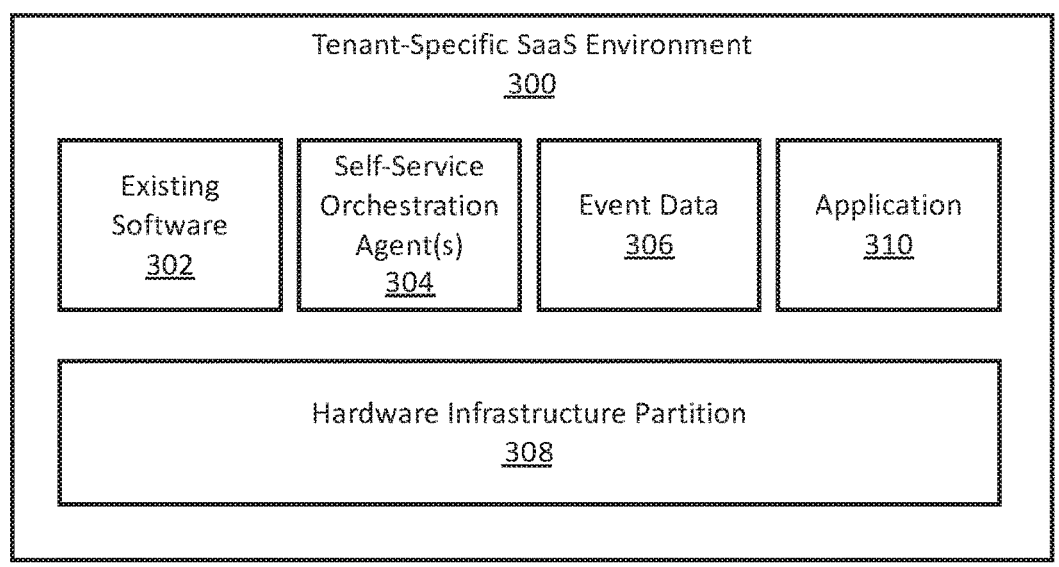
FIG. 3 illustrates a tenant-specific SaaS environment in accordance with one or more embodiments.

FIG. 3 illustrates a tenant-specific SaaS environment 300 in accordance with one or more embodiments. In one or more embodiments, the tenant-specific SaaS environment 300 may include more or fewer components than the components illustrated in FIG. 3. The components illustrated in FIG. 3 may be local to or remote from each other. One or more components illustrated in FIG. 3 may be implemented in software and/or hardware. Each component may be distributed over multiple applications and/or machines. Multiple components may be combined into one application and/or machine. Operations described with respect to one component may instead be performed by another component. Additional embodiments and/or examples relating to computer networks are described below.

In an embodiment, a tenant-specific SaaS environment 300 includes dedicated software (e.g., existing software 302) operating within a particular multi-tenant SaaS environment. In addition, the dedicated software operates on a hardware infrastructure partition 308, which is a dedicated logical partition of hardware in the multi-tenant SaaS environment. Each tenant-specific SaaS environment 300 in a multi-tenant SaaS environment is configured, respectively, to provide SaaS functionality to one or more specific tenants. In an embodiment, a tenant is a corporation, organization, enterprise or other entity that accesses a shared computing resource, such as one or more resources provided by a multi-tenant SaaS environment. In an embodiment, tenants are independent from each other. A business or operation of one tenant is separate from a business or operation of another tenant.

As described herein, a tenant-specific SaaS environment 300 is not a container. In contrast to a tenant-specific SaaS environment as described herein, a container is a standardized, encapsulated software-only module that executes on top of a container platform. A container platform executes in a host operating system, which operates on a set of underlying hardware infrastructure. Multiple containers may execute on a single container platform, sharing the same underlying operating system and unpartitioned hardware infrastructure. Each container is self-sufficient, in that it includes all the software needed to execute an application, such as a runtime environment, application code, system tools and libraries, settings, etc. In addition, whereas multiple containers share an underlying operating system and unpartitioned hardware infrastructure, multiple tenant-specific SaaS environments (e.g., tenant-specific SaaS environment 300) service multiple tenants using dedicated logical partitions of hardware infrastructure (e.g., hardware infrastructure partition 308). In an embodiment, the tenant-specific SaaS environment 300 is an Oracle Point of Delivery (PoD), not to be confused with the term "pod" as used in container technology (referring to a set of multiple containers operating on a shared operating system and hardware).

In an embodiment, existing software 302 is software that was deployed in the tenant-specific SaaS environment 300 before deploying a self-service configuration agent 304 to the tenant-specificSaaS environment 300. For example, the existing software 302 may include a runtime environment, application code, system tools and libraries, settings, etc. In an embodiment, deploying a self-service configuration agent 304 to the tenant-specificSaaS environment 300 does not reconfigure any of the existing software 302. For example, if the self-service configuration agent 304 includes a script (e.g., an SSH script), deploying the service configuration agent 304 to the tenant-specificSaaS environment 300 may store the script in the tenant-specificSaaS environment 300 without reconfiguring any of the existing software 302.

In an embodiment, a self-service configuration agent 304 configures a component of the tenant-specific SaaS environment 300. As used herein, configuring a component may include one or more of: installing the component, patching the component, upgrading the component, removing the component, modifying a setting of the component, and/or otherwise introducing, removing, or reconfiguring functionality of the component in the tenant-specific SaaS environment 300. In general, one or more embodiments provide self-service orchestration features that orchestrate some or all stages of the lifecycle of a tenant-specific SaaS environment 300 and/or one or more components thereof. For example, the tenant-specific SaaS environment 300 may be a test environment, and configuring the component may transfer data from a production environment (not shown) to the test environment. To transfer data from the production environment to the test environment, the self-service configuration agent 304 may obtain the data from another service configuration agent operating in the production environment.

In an embodiment, the self-service configuration agent 304 is configured to store event data 306. Event data 306 describes actions taken by the self-service configuration agent 304 to configure a component. Event data 306 may be used to roll back configuration of a component (e.g., by performing operations to undo the actions described in the event data 306), in the event of an error condition, as described below.

Figure 4:
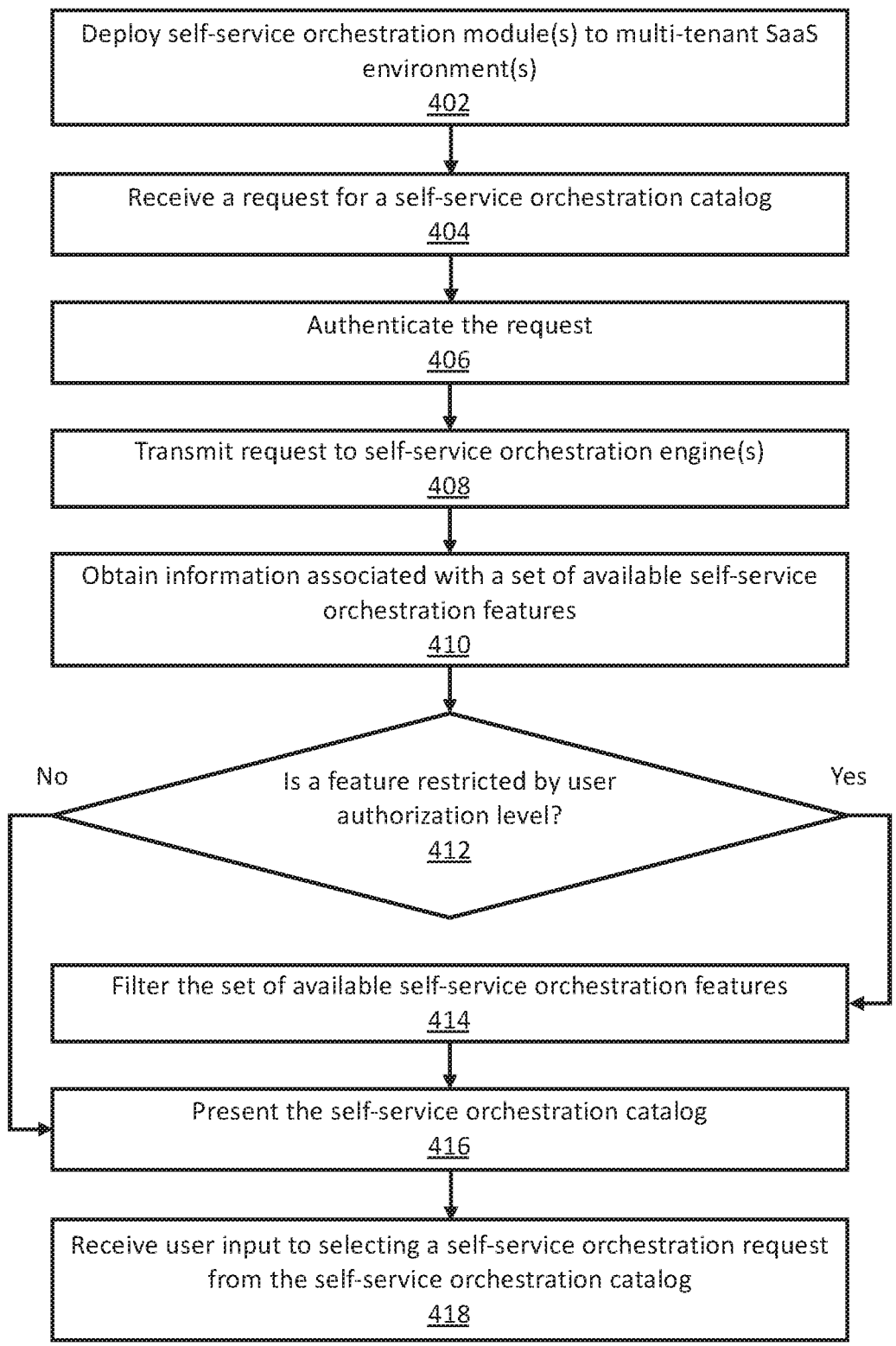
FIG. 4 illustrates a set of operations for obtaining a self-service orchestration catalog in accordance with one or more embodiments.

3. Self-Service Orchestration 3.1 Obtaining A Self-Service Orchestration Catalog FIG. 4 illustrates an example set of operations for obtaining a self-service orchestration catalog in accordance with one or more embodiments. One or more operations illustrated in FIG. 4 may be modified, rearranged, or omitted all together. Accordingly, the particular sequence of operations illustrated in FIG. 4 should not be construed as limiting the scope of one or more embodiments.

In an embodiment, a system (e.g., one or more components of the system illustrated in FIGS. 1-3) deploys one or more self-service orchestration modules to one or more multi-tenant SaaS environments (Operation 402). Deploying self-service orchestration modules is described above.

In an embodiment, the system receives a request for a self-service orchestration catalog (Operation 404), i.e., a catalog of self-service orchestration features that are available in the system. The request may be specific to a particular authorization level, such as a particular user, user group, user role, and/or another kind of authorization level. The request may be for a full self-service orchestration catalog, regardless of authorization level. The request may be for a catalog of self-service orchestration features available for all tenant-specific SaaS environments in the system. The request may be specific to one or more particular tenant-specific SaaS systems. For example, the request may be specific to one or more tenant-specific SaaS systems that service a particular tenant or group of tenants.

In an embodiment, the system authenticates the request (Operation 406). As described above, authentication may occur at one or more different stages of the process.

In an embodiment. the system transmits the request to one or more self-service authorization engine(s) (Operation 408). The system may transmit the request to all self-service authorization engine(s) operating in the system. The system may determine that the request is specific to one or more particular tenant-specific SaaS environments. The system may identify which multi-tenant SaaS environment(s) include the designated tenant-specific SaaS environment(s) and transmit the request to the self-service authorization engine(s) operating in the identified multi-tenant SaaS environment(s).

In an embodiment, the system obtains information associated with a set of available self-service orchestration features (Operation 410). The information may include data from one or more data repositories in one or more multi-tenant SaaS environments, as described above. In an embodiment, the self-service authorization engine provides the information to a self-service orchestration portal responsive to the request. Alternatively or additionally, the self-service authorization engine may transmit information about available self-service orchestration features to a self-service authorization portal at other times, such as when the information changes and/or at predetermined intervals (e.g., as part of a cron job), so that the self-service authorization portal does not need to request the information.

In an embodiment, for each available self-service orchestration feature, the system determines whether the feature is restricted by user authorization level (Operation 412). Specifically, the system may determine whether access to the feature is prohibited for a particular user, user group, user role, and/or another kind of authorization level. If the user requesting information about the features does not have the appropriate authorization level, then the system may filter the set of available self-service authorization features accordingly (Operation 414).

In an embodiment, the system presents the self-service orchestration catalog (Operation 416). The system may present the self-service orchestration catalog to a user via a user interface of a self-service orchestration portal. In an embodiment, the system receives user input selecting a particular self-service orchestration request from the self-service orchestration catalog (Operation 418).

3.2 Dispatching a Self-Service Orchestration Request

Figure 5:
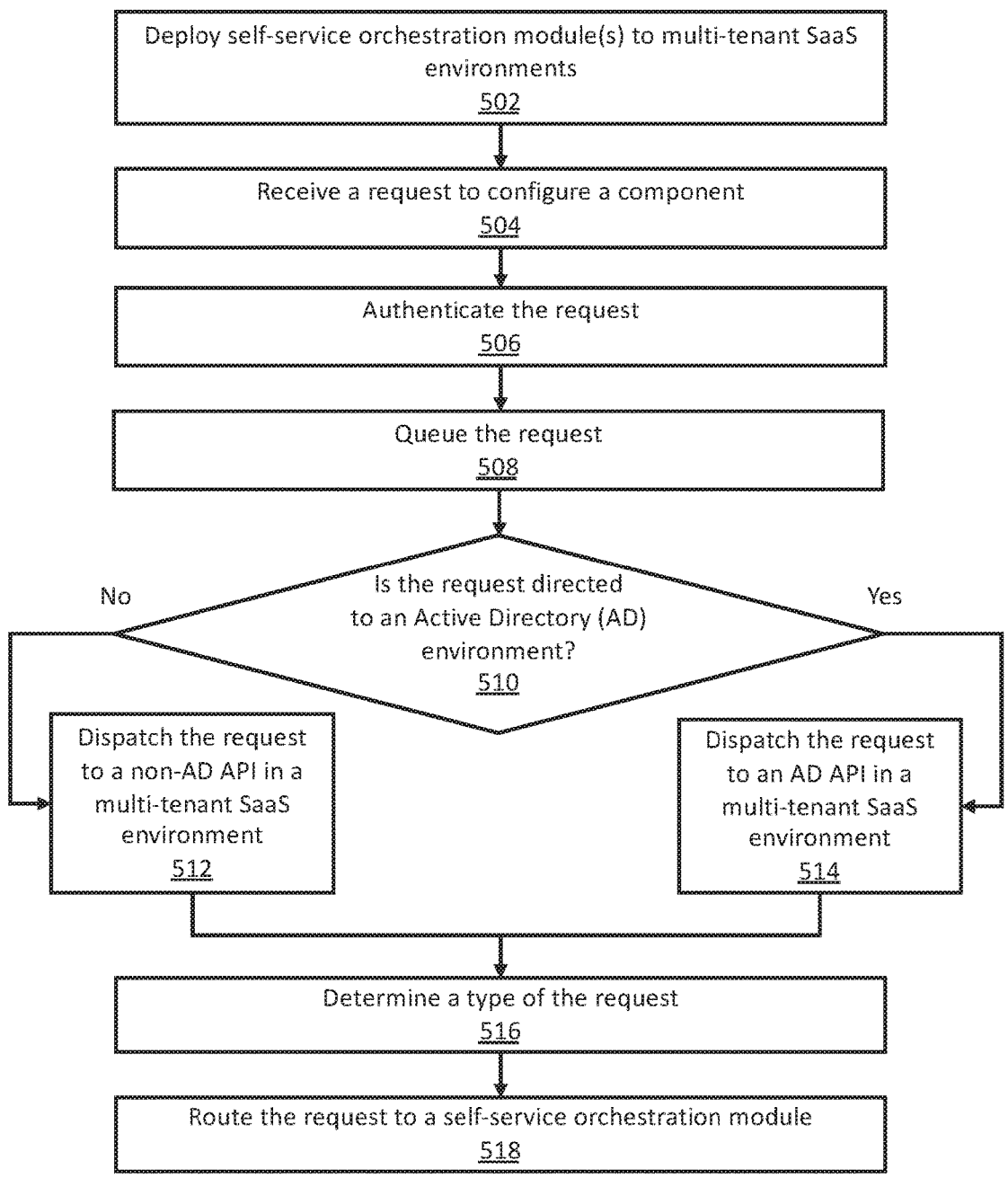
FIG. 5 illustrates a set of operations for dispatching a self-service orchestration request in accordance with one or more embodiments.

FIG. 5 illustrates an example set of operations for dispatching a self-service orchestration request in accordance with one or more embodiments. One or more operations illustrated in FIG. 5 may be modified, rearranged, or omitted all together. Accordingly, the particular sequence of operations illustrated in FIG. 5 should not be construed as limiting the scope of one or more embodiments.

In an embodiment, a system (e.g., one or more components of the system illustrated in FIGS. 1-3) deploys one or more self-service orchestration modules to one or more multi-tenant SaaS environments (Operation 502). Deploying self-service orchestration modules is described above.

In an embodiment, the system receives a request to configure a component using self-service orchestration (Operation 504). The request may be for one or more of: installing the component, patching the component, upgrading the component; removing the component, modifying a setting of the component, and/or otherwise introducing, removing, or reconfiguring functionality of the component. The request may be to configure the component in a specific tenant-specific SaaS environment. Alternatively or additionally, the request may be to configure the component in multiple specific tenant-specific SaaS environments. Alternatively or additionally, the request may be to configure the component in all tenant-specific SaaS environments in one or more specific multi-tenant SaaS environments. A request may be directed to many different arrangements of one or more tenant-specific SaaS environments or combinations thereof.

In an embodiment, the system authenticates the request (Operation 506). As described above, authentication may occur at one or more different stages of the process.

In an embodiment, the system queues the request (Operation 508). The system may handle requests in the queue according to a request handling policy. The request handling policy may be a first-in, first-out (FIFO) policy. Alternatively or additionally, the request handling policy may be priority-based, with higher-priority requests being handled before lower-priority requests. Alternatively or additionally, the request handling policy may throttle requests to avoid overutilizing system resources.

In an embodiment, the system determines whether the request is directed to an Active Directory (AD) environment (Operation 510). If the request is directed to an AD environment, then the system may dispatch the request to an AD API in a multi-tenant SaaS environment (Operation 514). If the request is directed to a non-AD environment, then the system may dispatch the request to a non-AD API in a multi-tenant SaaS environment (Operation 516). If the request is directed to multiple tenant-specific SaaS environments that include an AD environment and a non-AD environment, then the system may correspondingly dispatch the request to both an AD API and a non-AD API. More generally, different tenant-specific SaaS environments and/or multi-tenant SaaS environments may expose different kinds of API's, and the system may determine which kind of API to use when dispatching a request.

In an embodiment, the system determines a type of the request (Operation 518). Specifically, the system may determine that the request is to configure a particular component or type of component. As described above, the system may support multiple self-service orchestration modules for different types of requests.

In an embodiment, the system routes the request to a self-service orchestration module (Operation 518). The system may route the request to a particular self-service orchestration module based on the type of the request, as described above. In an embodiment, the self-service orchestration module services the request as described below.

3.3 Configuring a Component Based on a Self-Service Orchestration Request

Figure 6:
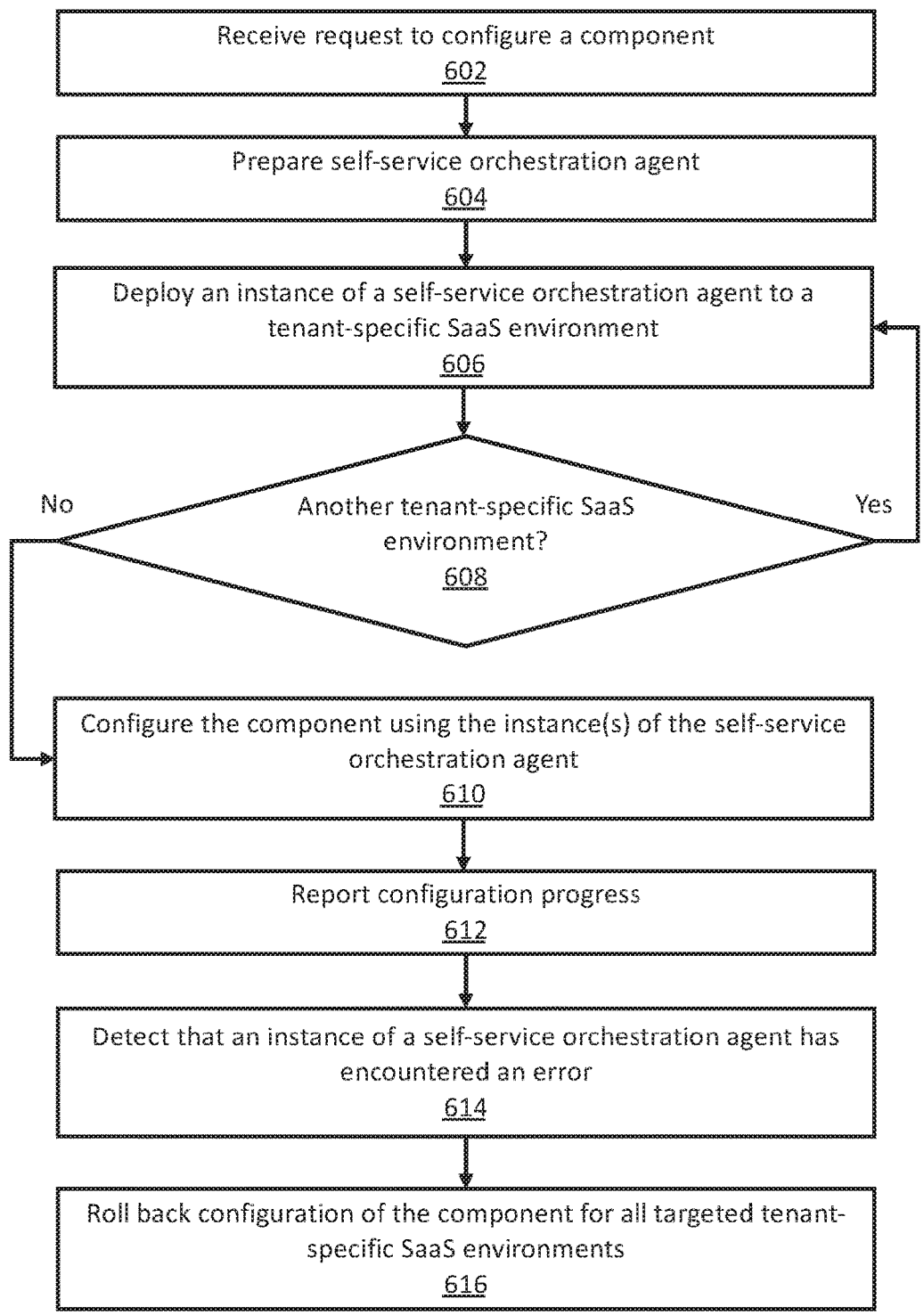
FIG. 6 illustrates a first set of operations for configuring a component based on a self-service orchestration request in accordance with one or more embodiments.

FIG. 6 illustrates an example set of operations for configuring a component based a self-service orchestration request in accordance with one or more embodiments. One or more operations illustrated in FIG. 6 may be modified, rearranged, or omitted all together. Accordingly, the particular sequence of operations illustrated in FIG. 6 should not be construed as limiting the scope of one or more embodiments.

In an embodiment, a system (e.g., one or more components of the system illustrated in FIGS. 1-3) receives a request to configure a component (Operation 602). The system may route the request to a self-service orchestration module operating in a multi-tenant SaaS environment, as described above. The request may be for one or more of: installing the component, patching the component, upgrading the component; removing the component, modifying a setting of the component, and/or otherwise introducing, removing, or reconfiguring functionality of the component. The request may be to configure the component in a specific tenant-specific SaaS environment in the multi-tenant SaaS environment. Alternatively or additionally, the request may be to configure the component in multiple specific tenant-specific SaaS environments in the multi-tenant SaaS environment. Alternatively or additionally, the request may be to configure the component in all tenant-specific SaaS environments in the multi-tenant SaaS environment. A request may be directed to many different arrangements of one or more tenant-specific SaaS environments or combinations thereof.

The system then prepares an executable file (e.g., a binary file) associated with configuring the component identified in the request (Operation 604). This executable file is described above as the self-service orchestration module 208. The executable file may be generated based on functionality or configurable parameters corresponding to the component identified in the request, as described above. The system may obtain the executable file by a developer of the component.

Once generated, the system deploys an instance of the self-service orchestration module 208 to a tenant-specific SaaS environment. This deployed instance of the self-service orchestration module 208 may be referred to as a self-service orchestration agent (operation 604). As described above, the system may deploy the instance of the self-service orchestration agent responsive to the request or prior to receiving the request. In an embodiment, the system deploys the instance of the self-service orchestration agent to the tenant-specific SaaS environment without reconfiguring any existing software in the tenant-specific SaaS environment. In some embodiments, the system may deploy the self-service orchestration agent using the drop-in architecture described above. In some embodiments, the self-service orchestration agent includes an engine to communicate with tenants of the multi-tenant SaaS environment via low level API calls (e.g., REST calls). The drop-in storage location can, in some cases receive configuration information from executable files or scripts that may be used to configure an interface for a self-service orchestration engine. Configuring the self-service orchestration engine based on the parameters, parameter types, and/or other configuration information further supports deployment and execution of functions in the self-service orchestration agent.

In an embodiment, if deploying an instance of a self-service orchestration agent to a tenant-specific SaaS environment is responsive to the request, the system may determines whether the request is directed to any other tenant-specific SaaS environment (Operation 608). In an embodiment, if the request is directed to another tenant-specific SaaS environment, the system also deploys an instance of the self-service orchestration agent to that tenant-specific SaaS environment (Operation 606). The system may deploy instances of the self-service orchestration agent to each tenant-specific SaaS environment indicated in the request.

In an embodiment, the system configures the component using the deployed instance(s) of the self-service orchestration agent (Operation 610). The instance of the self-service orchestration agent may include executable code that does not invoke any existing software in the tenant-specific SaaS environment, other than the runtime environment needed to execute the code. Alternatively or additionally, the instance of the self-service orchestration agent may invoke existing software in the tenant-specific SaaS environment (e.g., one or more system utilities, tools, applications, and/or other existing software). As described above, the instance of the self-service orchestration agent may include a script (e.g., an SSH script) or executable binary code that, when executed, invokes existing software in the tenant-specific SaaS environment to configure the component. Alternatively or additionally, the instance of the self-service orchestration agent may call an interface of a self-service orchestration module (configured based on parameter types in the executable file), operating outside of the tenant-specific SaaS environment, to obtain data needed to configure the component.

In an embodiment, the system reports configuration progress (Operation 612), during and/or after configuring the component. An instance of the self-service orchestration agent may report progress by submitting a progress update to an interface of a self-service orchestration module operating outside of the tenant-specific SaaS environment. The configuration progress may include job data and/or event data, as described above. Alternatively or additionally, an instance of a self-service orchestration agent may store event data, as described above, before and/or after configuring the component.

In an embodiment, the system detects that an instance of a self-service orchestration agent has encountered an error (Operation 614). Specifically, the system detect an error that prevents a particular instance of a self-service orchestration agent, deployed to a particular tenant-specific SaaS environment, from configuring the component according to the request. The particular instance of the self-service orchestration agent may be one of multiple instances of the self-service orchestration agent servicing the same request, respectively, in different tenant-specific SaaS environments.

In an embodiment, if the system detects that one instance of the self-service orchestration agent has encountered an error, then the system rolls back configuration of the component for all targeted tenant-specific SaaS environments (Operation 616). The system may roll back configuration of the component for all targeted tenant-specific SaaS environments even if one or more of the other instances of self-service orchestration agent have successfully configured the component according to the request. In each tenant-specific SaaS environment, the system may use event data to roll back configuration of the component (e.g., by performing operations to undo the actions described in the event data). In an embodiment, rolling back configuration of the component if even one self-service orchestration agent fails to configure the component helps ensure homogeneity of multiple tenant-specific SaaS environments. Divergent configurations of a component across different tenant-specific SaaS environments may lead to unpredictable and/or inconsistent behavior. In addition, manually correcting divergent configurations of a component across different tenant-specific SaaS environments may be time-consuming and/or expensive.

Figure 7:
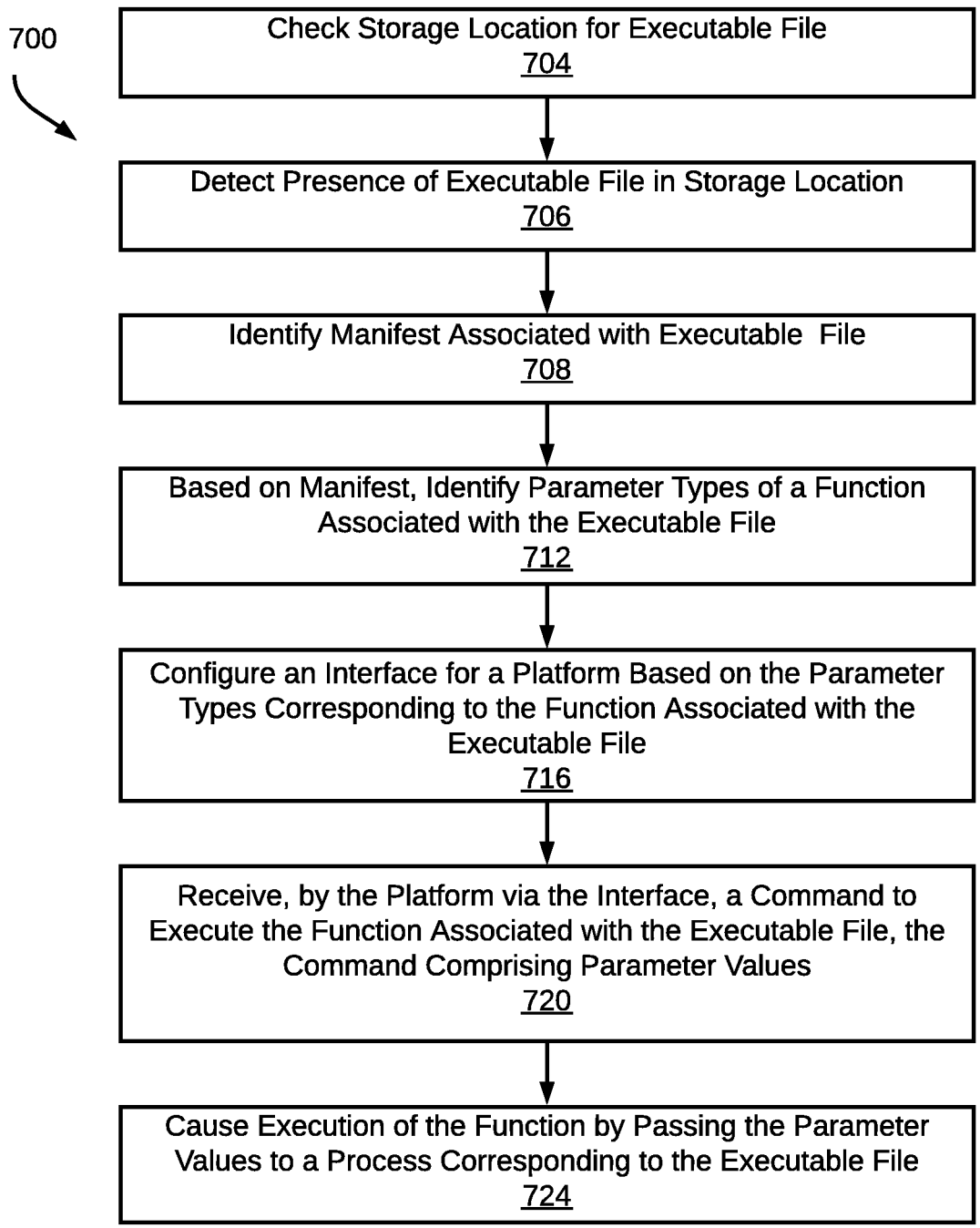
FIG. 7 illustrates a second set of operations for configuring a component based on a self-service orchestration request in accordance with one or more embodiments.

FIG. 7 illustrates an example set of operations for configuring a component based a self-service orchestration request in accordance with one or more embodiments. As with the example shown in FIG. 6, one or more operations illustrated in FIG. 7 may be modified, rearranged, or omitted all together. Accordingly, the particular sequence of operations illustrated in FIG. 7 should not be construed as limiting the scope of one or more embodiments.

In response to a self-service orchestration request, the method 700 may begin by the system checking one or more storage locations for an executable file (operation 704). In some embodiments, the system may check multiple storage locations for the executable file. The storage locations may be associated with one or more file paths and may reside in a cloud-based storage system or a local storage system. In some examples, the system may periodically check one or more storage locations for the executable file. In other examples, the system may check the one or more storage location upon request, or upon a notification of a change made to a file in the one or more storage locations. In some examples, at least a portion of the executable file may be composed of executable binary code.

In an embodiment, the system detects an executable file in the storage location (operation 706). In some examples, detecting the executable file may involve comparing files currently in the storage location to a list or record of previously detected files. In other examples, an executable file may be detected by detecting a change in the size of files stored in the storage location. The system may also detect the presence of a new executable file by detecting a modification made to an existing file (e.g., in content, version number, other file attributes), or receiving a notification that a new or revised executable file has been stored in the storage location. For example, in response to a self-service orchestration request, one or more elements of the system described above may check a storage location for an executable file received from the self-service portal.

In an embodiment, the system detects a manifest associated with the executable file (operation 708). In some examples, a manifest may be a separate file that accompanies an executable file. In this example, a manifest may be detected based on identification of keywords (e.g., "manifest" in the file title and/or file body content, a manifest-specific file extension). In other cases, the executable file may include a reference or link to the accompanying manifest. For examples in which a manifest is incorporated int an executable file itself, a document header or keyword may be used to identify (and separately interpret) the manifest.

Regardless of its form, once the manifest is identified, the system reads the manifest to identify functions associated with the executable file (operation 712). For example, function names and/or application names associated with the tenant-specific SaaS environment and identified in the manifest may be used to identify these functions. Function identities may be inferred based on parameter types, parameters and/or return values that are identified in the manifest. For example, a manifest description relating to packet inspection parameter types may be used to infer functions related to security.

The system may then configure an interface for a self-service orchestration engine based on the parameter types corresponding to the functions associated with the executable file (operation 716). As indicated above, configuring an interface of the self-service orchestration engine enables coordination between the self-service orchestration engine and the functions implemented by the self-service orchestration agent. For example, configuration of the interface enables the system to pass appropriate data or appropriately formatted data to associated functions implemented by the self-service orchestration agent. The system may configure the interface by storing a mapping between commands received by the interface and functions corresponding to executable file.

The platform (the self-service orchestration engine) may receive, via the interface, a command to execute a function associated with the executable file (i.e., the self-service orchestration agent) (operation 720). The command may include one or more parameter values. In some examples, the parameter values and the command may be received via a REST API call or other similar operation. The received command (e.g., a POST string) may be analyzed to identify a command name. Upon identifying the command name, the system may refer to the mapping of commands to functions associated with the executable file developed during configuration of the interface.

The system may cause execution of the function upon identification of the command by passing parameter values to a process corresponding to a function (identified by the mapping) of the executable file (operation 724). In some examples, the command and the associated parameter values may be passed using a POST command via a REST API call or other similar process.

In addition to the functions described in the executable file and executed by a self-service orchestration agent, the self-service orchestration engine may apply one or more policies to interactions with the self-service orchestration agent. The policies are applied based on functions that are separate from functions associated with the executable. Example policies may include one or more security policies (e.g., related to authentication or permission), auditing, communication routing policies and/or protocols, a life cycle management agent or life cycle management policies, automatic configuration policies, or dependencies related to the specific runtime environment. This separation between policies and executable functions associated with an executable file is beneficial because the more generic policies may be re-used for many different tenants. In other words, specific functional changes can be encoded in the executable file without also needing to encode less specific features into the executable file. In some embodiments, measurement functionality may also be applied to processes associated with execution of the function(s) of the executable file. The system may monitor performance of one or more of API call sources (and the call source identities), API call requests (and the call request identities), and request completion times, among other metrics.

As described herein, one or more embodiments introduce self-service orchestration features, for configuring components, to tenant-specific SaaS environments that each operate on a corresponding dedicated logical partition of hardware infrastructure in a multi-tenant SaaS environment. Self-service orchestration features are not built into these kinds of tenant-specific SaaS environments and would not otherwise be available in these kinds of tenant-specific SaaS environments. In addition, one or more embodiments introduce self-service orchestration features without migrating components to a different kind of environment, such as a container-based environment. Introducing self-service orchestration features without migrating components to a different kind of environment may be faster, less expensive, less disruptive to operations, and/or less error-prone than migrating components to a different kind of environment. In addition, deploying instances of self-service orchestration agents to the tenant-specific SaaS environments, without reconfiguring existing software in the tenant-specific SaaS environments, may avoid interfering with the operation of the existing software. In general, orchestration improves the efficiency of configuring components and reduces the frequency of errors and inaccuracies that occur when users try to configure software components manually.

4. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

5. Hardware Overview

According to one embodiment, the techniques described herein are implemented by one or more special-purpose computing devices (i.e., computing devices specially configured to perform certain functionality). The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 8:
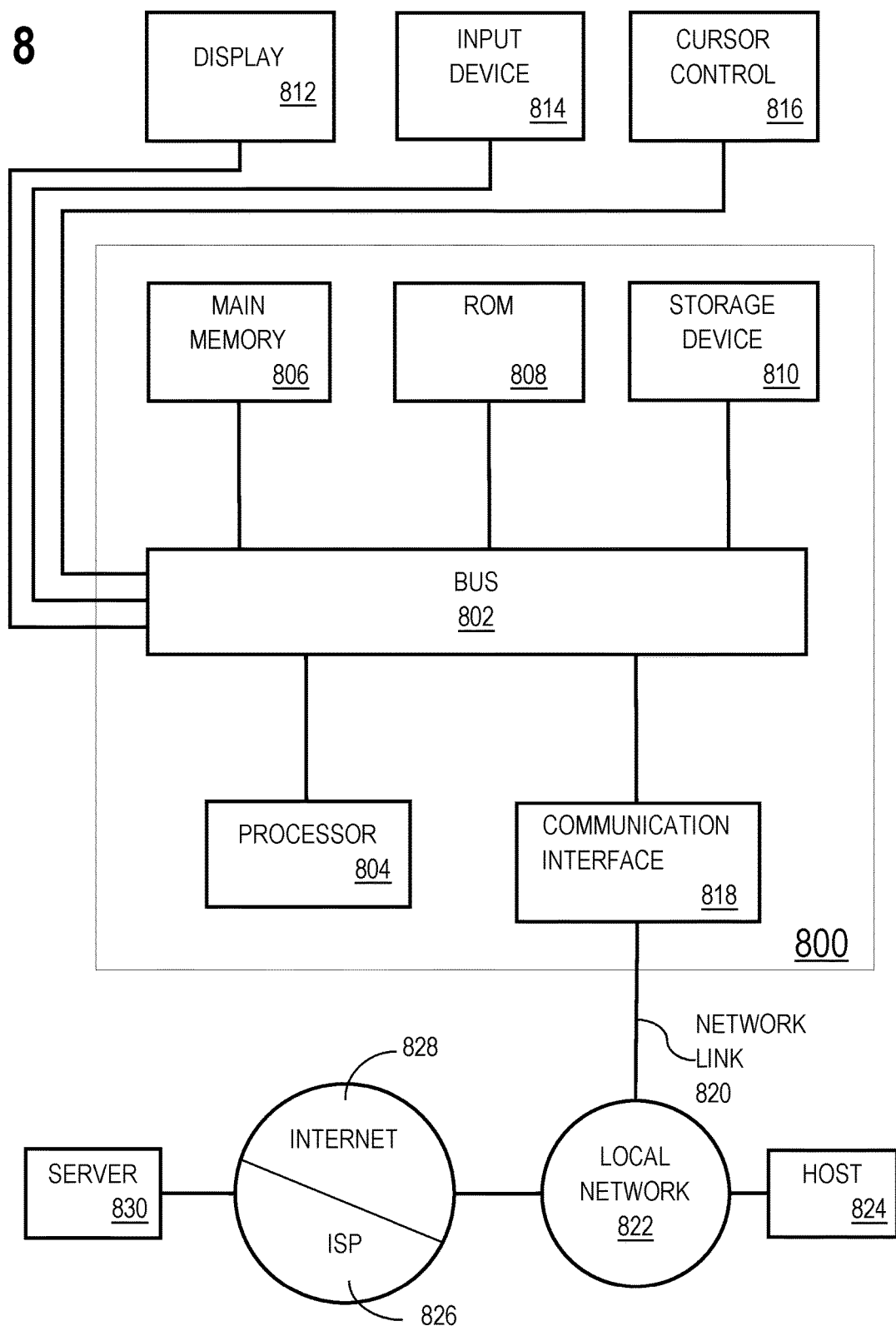
FIG. 8 shows a block diagram that illustrates a computer system in accordance with one or more embodiments.

For example, FIG. 8 is a block diagram that illustrates a computer system 800 upon which an embodiment of the invention may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a liquid crystal display (LCD), plasma display, electronic ink display, cathode ray tube (CRT) monitor, or any other kind of device for displaying information to a computer user. An input device 814, including alphanumeric and other keys, may be coupled to bus 802 for communicating information and command selections to processor 804. The computer system 800 may receive user input via a cursor control 816, such as a mouse, a trackball, a trackpad, a touchscreen, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane. The display 812 may be configured to receive user input via one or more pressure-sensitive sensors, multi-touch sensors, and/or gesture sensors. The computer system 800 may receive user input via a microphone, video camera, and/or some other kind of user input device (not shown).

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In other embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 810. Volatile media includes dynamic memory, such as main memory 806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a programmable read-only memory (PROM), and erasable PROM (EPROM), a FLASH-EPROM, non-volatile random-access memory (NVRAM), any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a network, via a network interface controller (NIC), such as an Ethernet controller or Wi-Fi controller. A NIC local to computer system 800 can receive the data from the network and place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

6. Computer Networks and Cloud Networks

In one or more embodiments, a computer network provides connectivity among a set of nodes running software that utilizes techniques as described herein. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be any physical resource that provides compute power to perform a task, such as one that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, one tenant (through operation, tenant-specific practices, employees, and/or identification to the external world) may be separate from another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

7. Microservice Applications

According to one or more embodiments, the techniques described herein are implemented in a microservice architecture. A microservice in this context refers to software logic designed to be independently deployable, having endpoints that may be logically coupled to other microservices to build a variety of applications. Applications built using microservices are distinct from monolithic applications, which are designed as a single fixed unit and generally comprise a single logical executable. With microservice applications, different microservices are independently deployable as separate executables. Microservices may communicate using HyperText Transfer Protocol (HTTP) messages and/or according to other communication protocols via API endpoints. Microservices may be managed and updated separately, written in different languages, and be executed independently from other microservices.

Microservices provide flexibility in managing and building applications. Different applications may be built by connecting different sets of microservices without changing the source code of the microservices. Thus, the microservices act as logical building blocks that may be arranged in a variety of ways to build different applications. Microservices may provide monitoring services that notify a microservices manager (such as If-This-Then-That (IFTTT), Zapier, or Oracle Self-Service Automation (OSSA)) when trigger events from a set of trigger events exposed to the microservices manager occur. Microservices exposed for an application may alternatively or additionally provide action services that perform an action in the application (controllable and configurable via the microservices manager by passing in values, connecting the actions to other triggers and/or data passed along from other actions in the microservices manager) based on data received from the microservices manager. The microservice triggers and/or actions may be chained together to form recipes of actions that occur in optionally different applications that are otherwise unaware of or have no control or dependency on each other. These managed applications may be authenticated or plugged in to the microservices manager, for example, with user-supplied application credentials to the manager, without requiring reauthentication each time the managed application is used alone or in combination with other applications.

In one or more embodiments, microservices may be connected via a GUI. For example, microservices may be displayed as logical blocks within a window, frame, other element of a GUI. A user may drag and drop microservices into an area of the GUI used to build an application. The user may connect the output of one microservice into the input of another microservice using directed arrows or any other GUI element. The application builder may run verification tests to confirm that the output and inputs are compatible (e.g., by checking the datatypes, size restrictions, etc.)

Triggers

The techniques described above may be encapsulated into a microservice, according to one or more embodiments. In other words, a microservice may trigger a notification (into the microservices manager for optional use by other plugged in applications, herein referred to as the "target" microservice) based on the above techniques and/or may be represented as a GUI block and connected to one or more other microservices. The trigger condition may include absolute or relative thresholds for values, and/or absolute or relative thresholds for the amount or duration of data to analyze, such that the trigger to the microservices manager occurs whenever a plugged-in microservice application detects that a threshold is crossed. For example, a user may request a trigger into the microservices manager when the microservice application detects a value has crossed a triggering threshold.

In one embodiment, the trigger, when satisfied, might output data for consumption by the target microservice. In another embodiment, the trigger, when satisfied, outputs a binary value indicating the trigger has been satisfied, or outputs the name of the field or other context information for which the trigger condition was satisfied. Additionally or alternatively, the target microservice may be connected to one or more other microservices such that an alert is input to the other microservices. Other microservices may perform responsive actions based on the above techniques, including, but not limited to, deploying additional resources, adjusting system configurations, and/or generating GUIs.

Actions

In one or more embodiments, a plugged-in microservice application may expose actions to the microservices manager. The exposed actions may receive, as input, data or an identification of a data object or location of data, that causes data to be moved into a data cloud.

In one or more embodiments, the exposed actions may receive, as input, a request to increase or decrease existing alert thresholds. The input might identify existing in-application alert thresholds and whether to increase or decrease, or delete the threshold. Additionally or alternatively, the input might request the microservice application to create new in-application alert thresholds. The in-application alerts may trigger alerts to the user while logged into the application, or may trigger alerts to the user using default or user-selected alert mechanisms available within the microservice application itself, rather than through other applications plugged into the microservices manager.

In one or more embodiments, the microservice application may generate and provide an output based on input that identifies, locates, or provides historical data, and defines the extent or scope of the requested output. The action, when triggered, causes the microservice application to provide, store, or display the output, for example, as a data model or as aggregate data that describes a data model.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory computer-readable media storing instructions, which when executed by one or more hardware processors, cause performance of operations comprising:
   responsive to detecting an executable file in a storage location, identifying a manifest corresponding to the executable file, wherein the manifest identifies (a) a function associated with the executable file and (b) one or more parameter types for one or more parameters of the function;
   reading the manifest, to identify (a) the function associated with the executable file and (b) the one or more parameter types for the one or more parameters of the function associated with the executable file;
   configuring an interface for accessing the function on a platform, based at least on the one or more parameter types of the function associated with the executable file;
   receiving, by the platform via the interface, a command to execute the function associated with the executable file, the command comprising one or more parameter values for the one or more parameters of the function; and
   causing execution of the function at least by passing the one or more parameter values to a process corresponding to the executable file.

2. The one or more media of claim 1, further comprising applying a policy to the process corresponding to the executable file, the policy separate from the executable file and including at least one or more of a security policy, an auditing policy, a communication routing policy, or a life cycle management agent.

3. The one or more media of claim 2, wherein the policy is associated with an environment within which the process operates.

4. The one or more media of claim 3, wherein the policy further enables at least one of an auto-configuration function for the process or specifies environment dependencies corresponding to the process.

5. The one or more media of claim 1, further comprising applying measurement functionality to the process, the measurement functionality identifying at least one of API call sources, API call requests, and measuring request completion times.

6. The one or more media of claim 1, wherein the manifest further identifies a script in the executable file.

7. The one or more media of claim 1, wherein the manifest further defines a map identifying at least one script in the executable file and a corresponding function.

8. The one or more media of claim 1, further comprising inferring an identity of the function associated with the executable file based on one or more of the one or more parameter types and parameters and return values identified in the manifest.

9. The one or more non-transitory computer-readable media of claim 1, wherein identifying the manifest comprises determining that a particular file comprises one or more keywords indicating that the particular file comprises the manifest.

10. The one or more non-transitory computer-readable media of claim 1, wherein identifying the manifest corresponding to the executable file comprises identifying, in the executable file, a reference to a location of the manifest.

11. The one or more non-transitory computer-readable media of claim 1, wherein the manifest is incorporated in the executable file.

12. A method comprising:
   identifying a manifest corresponding to an executable file responsive to detecting the executable file in a storage location, wherein the manifest identifies (a) a function associated with the executable file and (b) one or more parameter types for one or more parameters of the function;
   reading the manifest, to identify (a) the function associated with the executable file and (b) the one or more parameter types for the one or more parameters of the function associated with the executable file;
   configuring an interface for accessing the function on a platform, based at least on the one or more parameter types of the function associated with the executable file;
   receiving, by the platform via the interface, a command to execute the function associated with the executable file, the command comprising one or more parameter values for the one or more parameters of the function; and
   causing execution of the function at least by passing the one or more parameter values to a process corresponding to the executable file.

13. The method of claim 12, further comprising applying a policy to the process corresponding to the executable file, the policy separate from the executable file and including at least one or more of a security policy, an auditing policy, a communication routing policy, or a life cycle management agent.

14. The method of claim 13, wherein the policy is associated with an environment within which the process operates.

15. The method of claim 14, wherein the policy further enables at least one of an auto-configuration function for the process or specifies environment dependencies corresponding to the process.

16. The method of claim 12, further comprising applying measurement functionality to the process, the measurement functionality identifying at least one of API call sources, API call requests, and measuring request completion times.

17. The method of claim 12, wherein the manifest further identifies a script in the executable file.

18. The method of claim 12, wherein the manifest further defines a map identifying at least one script in the executable file and a corresponding function.

19. The method of claim 12, further comprising periodically checking a storage location for the executable file.

20. The method of claim 12, further comprising inferring an identity of the function associated with the executable file based on one or more of the one or more parameter types and parameters and return values identified in the manifest.

* * * * *

UNITED STATES PATENT AND TRADEMARK OFFICE
CERTIFICATE OF CORRECTION

PATENT NO. : 11,481,228 B2
APPLICATION NO. : 16/815601
DATED : October 25, 2022
INVENTOR(S) : Rangasamy et al.

It is certified that error appears in the above-identified patent and that said Letters Patent is hereby corrected as shown below:

In the Specification

In Column 9, Line 12, delete "tenant-specificSaaS" and insert -- tenant-specific SaaS --, therefor.

In Column 9, Line 16, delete "tenant-specificSaaS" and insert -- tenant-specific SaaS --, therefor.

In Column 9, Line 20, delete "tenant-specificSaaS" and insert -- tenant-specific SaaS --, therefor.

In Column 9, Line 21, delete "tenant-specificSaaS" and insert -- tenant-specific SaaS --, therefor.

In Column 10, Line 15, delete "embodiment." and insert -- embodiment, --, therefor.

Signed and Sealed this
Twentieth Day of June, 2023

Katherine Kelly Vidal
*Director of the United States Patent and Trademark Office*